United States Patent
Lee et al.

(10) Patent No.: US 8,514,591 B2
(45) Date of Patent: Aug. 20, 2013

(54) POWER SUPPLY DEVICE AND DRIVING METHOD THEREOF

(75) Inventors: Min-Woo Lee, Bucheon (KR);
Kyung-Oun Jang, Bucheon (KR);
Sung-Won Yun, Seoul (KR);
Dae-Woong Cho, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 13/475,730

(22) Filed: May 18, 2012

(65) Prior Publication Data

US 2012/0300506 A1    Nov. 29, 2012

(51) Int. Cl.
*H02M 3/335* (2006.01)

(52) U.S. Cl.
USPC .......................................... 363/21.01; 363/97

(58) Field of Classification Search
USPC ........... 363/16, 20, 21.01, 21.09, 21.1, 21.15, 363/21.17, 21.18, 78, 95, 97, 131
See application file for complete search history.

(56) References Cited

U.S. PATENT DOCUMENTS

| | | | |
|---|---|---|---|
| 5,313,381 A * | 5/1994 | Balakrishnan | 363/147 |
| 6,212,079 B1 * | 4/2001 | Balakrishnan et al. | 363/21.03 |
| 6,665,197 B2 | 12/2003 | Gong et al. | |
| 6,721,192 B1 * | 4/2004 | Yang et al. | 363/21.18 |
| 6,958,920 B2 * | 10/2005 | Mednik et al. | 363/19 |
| 6,975,520 B2 | 12/2005 | Sugimoto | |
| 8,014,172 B2 * | 9/2011 | Reinberger et al. | 363/16 |
| 8,102,676 B2 * | 1/2012 | Huynh et al. | 363/21.01 |
| 8,339,815 B2 * | 12/2012 | Lee et al. | 363/21.15 |
| 8,374,004 B2 * | 2/2013 | Sutardja et al. | 363/21.12 |
| 2012/0188794 A1 * | 7/2012 | Chang et al. | 363/16 |

FOREIGN PATENT DOCUMENTS

KR    10-2005-0119401    12/2005

* cited by examiner

*Primary Examiner* — Adolf Berhane
(74) *Attorney, Agent, or Firm* — Okamoto & Benedicto LLP

(57) ABSTRACT

The present invention relates to a power supply device generating an output power by using an AC line voltage generated through rectification of an AC input, and a driving method thereof. The power supply device controls the switching operation of the power switch by using a sensing voltage corresponding to the drain current flowing to the power switch and the feedback voltage corresponding to the output voltage. The power supply device controls the feedback current every switching cycle to generate a threshold voltage, and compares the sensing voltage and the threshold voltage to control the turn-off of the power switch. The feedback current includes the first current to generate the feedback voltage, and the threshold voltage follows a curved line waveform in which the increasing slope is decreased during the switching cycle.

18 Claims, 4 Drawing Sheets

POWER SUPPLY DEVICE AND DRIVING METHOD THEREOF

CROSS-REFERENCE TO RELATED APPLICATION

This application claims priority to and the benefit of Korean Patent Application No. 10-2011-0049737 filed in the Korean Intellectual Property Office on May 25, 2011, the entire contents of which are incorporated herein by reference.

BACKGROUND OF THE INVENTION (a) Field of the Invention

The present invention relates a power supply device and a driving method thereof. Particularly, a power supply device controlling a power supply according to a switching operation and a driving method thereof are provided.

(b) Description of the Related Art

An AC input voltage input to a power supply device is rectified, thereby becoming an AC line voltage. The AC line voltage is transmitted to a primary coil of a power supply device, and a primary current by the AC line voltage flows to the primary coil according to a switching operation of a power switch connected to the primary coil.

The primary current is increased during a period in which the power switch is in an on state, and an increasing slope of the primary current is changed according to an AC line voltage. If the drain current flowing to the power switch of the power switch reaches a predetermined reference value among the turn-on period, the power switch is turned off.

However, a predetermined delay period exists between a time that the drain current reaches the reference value and the power switch is actually turned off. The drain current is increased during the delay period. Thus, the drain current may be over a maximum current limitation value.

Particularly, the slope of the drain current is large when the AC line voltage is high such that the drain current is quickly increased during the delay period to be over the maximum current limitation value. This may damage the power switch.

Particularly, in a state in which an overload is connected to the power supply device, when the duty of the power switch is operated at maximum, the drain current being over the maximum current limitation value in the period in which the AC line voltage is high is frequently repeated. This may generate serious damage to the power switch.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention to solve the above-described problem provides a power supply device in which a drain current of a power switch is not over a maximum current limitation value, and a driving method thereof.

The power supply device according to the present invention generates an output power by using an AC line voltage generated through rectifying an AC input. The power supply device includes: a transformer including a first coil input with the AC line voltage; a power switch connected to the first coil; a feedback circuit generating a feedback voltage corresponding to an output voltage of the output power; and a switch control circuit receiving a sensing voltage corresponding to a drain current flowing to the power switch and the feedback voltage, generating a threshold voltage by controlling a feedback current every switching cycle of the power switch, and comparing the sensing voltage and the threshold voltage to control the switching operation of the power switch, wherein the feedback current includes a first current to generate the feedback voltage, and the threshold voltage follows a curved line waveform of which an increasing slope thereof is decreased during the switching cycle.

The switch control circuit includes a slope compensator maintaining constant impedance during a predetermined initial period from the switching cycle time and having impedance that is increased after the passage of the initial period, and the feedback current includes a second current supplied to the slope compensator.

The slope compensator includes: a first resistor; a second resistor connected to the first resistor in series; a capacitor connected to the second resistor; and a switch connected in parallel to the capacitor, wherein the second current flows through the first resistor, the second resistor, and the switch during the initial period, and the second current flows through the first resistor, the second resistor, and the capacitor after the initial period.

The switch control circuit further includes a feedback controller generating the feedback current and connected to the slope compensator and the feedback circuit, and the feedback controller generates the threshold voltage by using a third current among a remaining current of which the first current and the second current are subtracted from the feedback current.

The feedback controller includes a first diode including an anode connected to the current copy circuit, a third resistor connected to a cathode of the first diode, and a fourth resistor connected to the third resistor in series, wherein the third current flows to the third resistor and the fourth resistor through the first diode, and the threshold voltage is determined by the third current and the fourth resistor.

The feedback controller includes a second diode including an anode connected to the current copy circuit and a cathode connected to the feedback circuit, and a third diode including an anode connected to the current copy circuit and a cathode connected to the slope compensator.

The feedback controller further includes a fourth diode including an anode connected to the current copy circuit and a cathode connected to the peak resistor, and the fourth current of the feedback current except for the first to third currents is supplied to the peak resistor.

The switch control circuit controls a switching operation of the power switch by using a clock signal having a predetermined frequency, the switch is switching-operation according to the clock signal, and the initial period is a first level (a high level) directly before the power switch is turned on by the clock signal.

The switch control circuit controls a turn-off time of the power switch according to a result of comparing the threshold voltage and the sensing voltage, and includes a PWM controller turning on the power switch when the clock signal is changed from the first level to the second level.

The PWM controller includes a comparator comparing the threshold voltage and the sensing voltage, an LEB generating the output of the third level during a predetermined blanking period from the turn-on time of the power switch, and a first logical calculation unit logical-calculating the output of the LEB and the comparator to generate an off control signal controlling a turn-off time of the power switch.

The first logical calculation unit generates the off control signal of a level that does not turn off the power switch by the third level output of the LEB during the blanking period.

The PWM controller includes an oscillator generating a clock signal, an SR flip-flop generating a duty control signal according to the clock signal and the off control signal, and a second logical calculation unit generating a gate control signal according to the clock signal and the output of the SR flip-flop, wherein the SR flip-flop changes the level of the duty control signal into a fourth level when the level of the clock signal is changed from the second level to the first level after the turn-off time of the power switch, the first logical calculation unit changes the level of the off control signal into a fifth level in synchronization with a time at which the sensing voltage reaches the threshold voltage, and the second logical calculation unit generates a gate control signal turning off the power switch according to an off control signal of the fifth level, and generates the gate control signal turning on the power switch when the level of the clock signal is changed from the first level to the second level after the generation of the duty control signal of the fourth level.

A driving method of a power supply device according to the present invention relates to a driving method of a power supply device including a feedback circuit generating a feedback voltage corresponding to an output voltage and a power switch controlling the output voltage.

The driving method of the power supply device includes: generating a feedback current; supplying a first current among the feedback current to a feedback circuit to generate a feedback voltage corresponding to the output voltage; forming a path through which a second current flows among the feedback current and increasing impedance of the path among a switching cycle of the power switch; and generating a threshold voltage to control a turn-off time of the power switch by using a third current among the feedback current.

The driving method further includes constantly maintaining the impedance of the path during a predetermined initial period from the switching cycle time of the power switch.

The path includes a resistor and a capacitor, and the increasing of the impedance of the path includes charging the capacitor by the second current, and decreasing the second current by the charging of the capacitor.

The second current is decreased with an exponential function according to a time constant determined by the resistor and the capacitor.

The driving method further includes comparing the threshold voltage and a sensing voltage corresponding to a current flowing to the power switch to determine a turn-off time of the power switch.

The second current is decreased with a shape in which a decreasing slope is decreased, and the third current is decreased with a shape in which an increasing slope is decreased.

The present invention provides the power supply device in which the drain current of the power switch is not over a maximum current limitation value, and a driving method thereof.

DETAILED DESCRIPTION OF THE EMBODIMENTS

Figure 1:
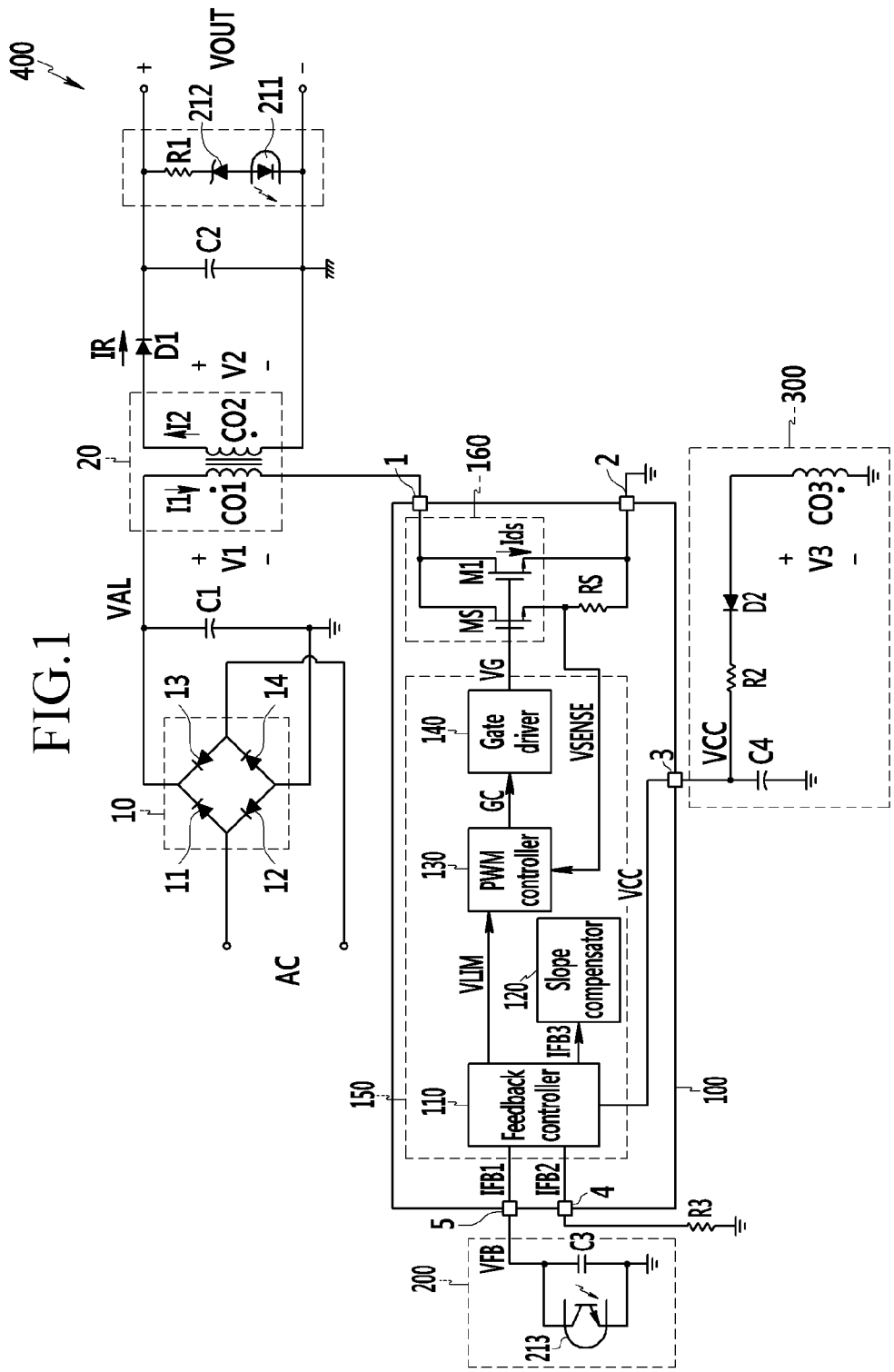
FIG. 1 is a view showing a power supply device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a view showing a power supply device according to an exemplary embodiment of the present invention.

As shown in FIG. 1, a power supply device 400 includes a bridge rectifier diode 10, a smoothing capacitor C1, a transformer 20, a switch circuit 100, a feedback circuit 200, a power source voltage supply unit 300, a rectifier diode D1, and an output capacitor C2.

The bridge rectifier diode 10 rectifies an AC input AC to generate an AC line voltage VAL. The bridge rectifier diode 10 includes four diodes 11-14.

The smoothing capacitor C1 smoothes a ripple component of the AC line voltage VAL.

The transformer 20 converts primary power generated by the AC line voltage VAL and transmits it to a secondary side. The transformer 20 includes a first coil CO1 positioned at the primary side and a second coil CO2 positioned at the secondary side. The first coil CO1 includes one terminal transmitted with the AC line voltage VAL and the other terminal connected to a power switch 160. The second coil CO2 is formed at the secondary side, and the voltage and the current are generated at the second coil CO2 by the power transmitted from the primary side.

A turn ratio (a turn number of CO2 ns/a turn number of CO1 np) nps is determined according to the turn number of the first coil CO1 and the turn number of the second coil CO2. The ratio V2/V1 between the voltage V1 of the first coil CO1 and the voltage V2 of the second coil CO2 of the transformer 20 is proportional to the turn ratio nps, and the ratio I2/I1 between the current I1 of the first coil CO1 and the current I2 of the second coil CO2 is inversely proportional to the turn ratio nps.

The diode D1 includes an anode connected to one terminal of the second coil CO2 and a cathode connected to one terminal of the output capacitor C2. The diode D1 rectifies the current I2 flowing to the second coil CO2. The current IR flowing through the diode D1 is supplied to a load and charges the output capacitor C2.

The output capacitor C2 is charged by the current IR, or is discharged to supply the current to the load.

The power switch 160 is connected to the first coil CO1, and the current I1 flowing to the first coil CO1 is controlled by the switching operation of the power switch 160. The current I1 is increased during a period in which the power switch 160 is turned on, and does not flow during a period in which the power switch 160 is turned off.

During the period in which the power switch 160 is turned on, while the current I1 is increased, energy is stored to the first coil CO1. Here, the rectifier diode D1 is in the off state such that the current does not flow to the second coil CO2. During the period in which the power switch 160 is turned off, the current I2 of the secondary coil CO2 flows from the second coil CO2 to the anode of the anode of the rectifier diode D1 and is rectified through the rectifier diode D1 to generate the current IR.

As the load connected to the output terminal of the power supply device 400 is increased such that the current supplied to the load is increased, the output capacitor C2 is discharged such that the output voltage VOUT is decreased. In contrast, as the load is decreased such that the current supplied to the load is decreased, the output capacitor C2 is charged by the current IR such that the output voltage VOUT is increased.

The feedback circuit 200 generates the feedback voltage VFB corresponding to the output voltage VOUT and transmits it to the switch circuit 100. The feedback voltage VFB is changed according to the output voltage VOUT.

The feedback circuit 200 includes a resistor R1, a zener diode 212, a photodiode 211, a capacitor C3, and a phototransistor 213. The resistor R1, the zener diode 212, and the photodiode 211 are coupled in series between the output terminal (+) and a predetermined power source, for example, a ground terminal. The phototransistor 213 is connected between a feedback terminal 5 of the switch circuit 100 and the predetermined power source, for example, the ground terminal, thereby forming an opto-coupler along with the photodiode 211.

The zener diode 212 is connected by the output voltage VOUT, and the current corresponding to the output voltage VOUT flows through the photodiode 211. The current flows between a collector and an emitter of the phototransistor 213 according to the current flowing to the photodiode 211.

If the current flowing to the phototransistor 213 is increased, impedance at the feedback terminal 5 is decreased such that the feedback voltage VFB is decreased. In contrast, if the current flowing to the phototransistor 213 is decreased, impedance at the feedback terminal 5 is increased such that the feedback voltage VFB is increased.

Accordingly, if the output voltage VOUT is increased, the feedback voltage VFB is decreased, and if the output voltage VOUT is decreased, the feedback voltage VFB is increased. Here, another circuit may be used for the feedback circuit as well as the optocoupler.

The power source voltage supply unit 300 supplies the power source voltage VCC to operate the switch circuit 100. The power source voltage supply unit 300 includes a third coil L3, a diode D2, a resistor R2, and a capacitor C4.

The third coil L3 is insulated-coupled to the first coil CO1 while having a predetermined turn ratio. One terminal of the third coil L3 is connected to the anode of the diode D2, and the other terminal thereof is grounded. The resistor R2 is connected between the cathode of the diode D2 and a power source voltage terminal 3, and the capacitor C4 is connected between the power source voltage terminal 3 and the ground.

The diode D2 is connected by the voltage V3 generated at the third coil L3, and the capacitor C4 is charged by the current generated at the third coil L3. The voltage charged to the capacitor C4 is the power source voltage VCC.

The switch circuit 100 controls the switching operation of the power switch 160, and thereby the primary power is converted and the power supply operation transmitted to the secondary side is controlled. In detail, the switch circuit 100 includes the power switch 160 and a switch control circuit 150 controlling the switching operation of the power switch 160.

The power switch 160 includes a switch M1 and a switch MS. The switch MS is realized by a transistor to sense the current flowing to the power switch 160. The transistor forming the switch M1 has a wider channel compared with the transistor forming the switch MS. Accordingly, the current flowing to the switch MS is smaller than the current flowing to the switch M1.

For convenience of explanation, the drain current Ids flowing to the power switch 160 includes both the current flowing to the switch M1 and the switch MS. The drain electrode of the power switch 160 is connected to the first coil CO1 through a drain terminal 1. The source electrode of the switch M1 is grounded through a source terminal 2, and the source electrode of the switch MS is connected to the sensing resistor RS.

However, the power switch 160 of the present invention is not limited to the shape shown in FIG. 1. The power switch 160 may not include the switch MS, and the sensing resistor RS may be directly connected between the source electrode of the switch M1 and the ground.

The power switch 160 shown in FIG. 1 is a MOSFET of an N-channel type, however the present invention is not limited thereto. The sensing resistor RS is connected between the source electrode of the switch MS and the ground terminal, and during a period in which the power switch 160 is turned on, it is a constitution to sense the drain current Ids flowing from the drain electrode to the source electrode of the power switch 160. In detail, a very small current among the drain current Ids flows to the sensing resistor RS such that the sensing voltage VSENSE corresponding to the drain current Ids is generated.

The switch control circuit 150 according to an exemplary embodiment of the present invention includes a feedback controller 110, a slope compensator 120, a PWM controller 130, and a gate driver 140. The switch control circuit 150 is connected to the power source voltage terminal 3, a peak terminal 4, and the feedback terminal 5, and receives the feedback voltage VFB, the power source voltage VCC, and the peak voltage VP.

The switch control circuit 150 is connected to one terminal of the sensing resistor RS, thereby receiving the sensing voltage VSENSE. Also, the switch control circuit 150 determines a turn-on time of the power switch 160 according to a clock signal CLK having a predetermined frequency.

The switch control circuit 150 compares the sensing voltage VSENSE and the threshold voltage VLIM to control the turn-off of the power switch 160.

The switch control circuit 150 controls the feedback current IFB of the feedback controller 110 every switch of one cycle of the power switch 160 to generate the threshold voltage VLIM. During the switching of one cycle of the power switch 160, the threshold voltage VLIM is increased with a curved line shape in which the increasing slope is decreased from an initial voltage.

To increase the threshold voltage VLIM with the curved line shape from the initial voltage per switching cycle is to not go over the current limitation value by the increasing slope of the current I1 that is changed according to the size of the AC line voltage VAL and the transmission delay for the current I1.

Figure 2:
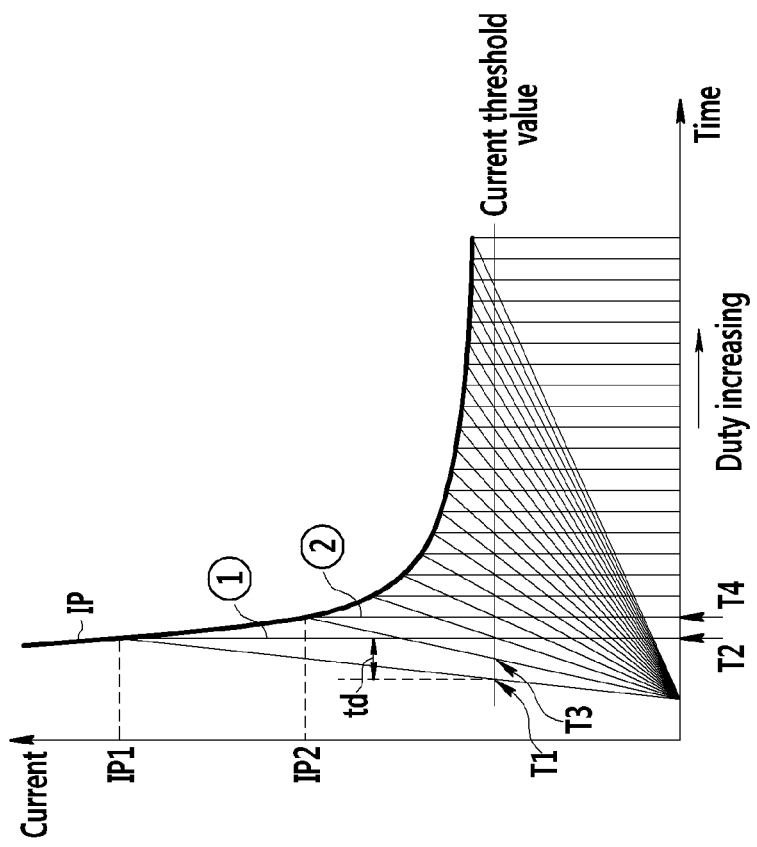
FIG. 2 is a view of a case in which a current of a conventional power switch is over a current limitation value.

FIG. 2 is a view of a case in which a current of a conventional power switch is over a current limitation value. During the period in which the power switch is turned on, the current flowing to the primary coil of the conventional power supply device is the same as the current of the power switch. In FIG. 2, the horizontal axis is a time axis and the vertical axis indicates the size of the current.

A plurality of current waveforms shown in FIG. 2 are a plurality of current waveforms flowing to the power switch when the duty is increased. As the AC input is increased, the AC line voltage is also increased. As the AC line voltage is increased, the increasing slope of the current flowing to the primary coil is also increased. As the AC line voltage is increased, the duty is decreased under the condition of the same load. A plurality of current waveforms shown in FIG. 2 are the current waveforms of the power switch according to the AC line voltage in the same load condition (for example, the overload).

The first current waveform among a plurality of current waveforms shown in FIG. 2 is the current waveform when the AC line voltage is applied to the primary coil.

The first current waveform reaches the current threshold value at the time T1, however the power switch is turned off at the time T2 by the delay td. Accordingly, the primary current is increased to "IP1".

In the second current waveform, the AC line voltage is low compared with the first current waveform. The second current waveform reaches the current threshold value as the time T3, however the power switch is turned off by the delay td at the time T4. Accordingly, the primary current is increased to "IP2".

"IP" shown in FIG. 2 is a curve in which peak values of the power switch current are connected when the duty is increased according to the increasing of the AC line voltage. As shown in FIG. 2, the IP is decreased with an exponential function. As the AC line voltage is increased, a degree by which the current of the power switch is increased by the delay is increased and then is far over the current threshold value, as shown in FIG. 2.

Particularly, when the AC line voltage is high, the current amount that is over the current threshold value is very large.

To prevent this overcurrent phenomenon, the switch control circuit 150 according to an exemplary embodiment of the present invention controls the threshold voltage VLIM every switching cycle of the power switch 160 such that the turn-off time of the power switch 160 is advanced as the AC line voltage is increased.

The feedback controller 110 generates the feedback current IFB and distributes and supplies the feedback current IFB according to the impedance of the feedback terminal 5, the impedance of the peak terminal 4, and the impedance of the slope compensator 120 to generate a threshold voltage VLIM by using the current IFB4.

The impedance of the feedback terminal 5 is changed according to the output voltage VOUT, and the impedance of the peak terminal 4 is fixed by the resistor R3. Here, the output voltage VOUT is determined according to the load, and the load being changed as the unit of the switching operation unit is hardly generated. That is, it may be regarded that the output voltage VOUT is constant in the switching cycle unit such that the impedance of the feedback terminal 5 is also constant in the switching cycle unit.

The slope compensator 120 changes the impedance of the slope compensator 120 during the switching cycle of the power switch 160. Accordingly, the current IFB4 is controlled according to the slope compensator 120.

The resistor R3 connected to the peak terminal 4 is a constitution to control the current threshold value that may flow to the power switch 160. That is, if the resistor R3 is small, the current IFB2 is increased and the current IFB4 is decreased. Accordingly, the threshold voltage VLIM is decreased such that the current threshold value is decreased. However, this is not changed every switching cycle and is determined according to the condition for a user, and thereby it is a value that is fixedly set.

The slope compensator 120 slowly increases the impedance of the slope compensator 120 after the turn-on time of the power switch 160. Thus, the current IFB3 is slowly decreased, and the current IFB4 is slowly increased.

The PWM controller 130 compares the threshold voltage VLIM and the sensing voltage VSENSE, and if the sensing voltage VSENSE reaches the threshold voltage VLIM, the gate control signal GC turning off the power switch 160 is generated.

The PWM controller 130 turns on the power switch 160 as a unit of one cycle of the clock signal CLK having a constant frequency. In an exemplary embodiment of the present invention, the gate control signal GC turning on the power switch 160 is generated in synchronization with the decreasing edge of the clock signal CLK. The gate driven 140 generates the gate signal VG for the switching operation of the power switch 160 according to the gate control signal GC.

Next, a detail constitution of a switch control circuit 150 will be described with reference to FIG. 3.

Figure 3:
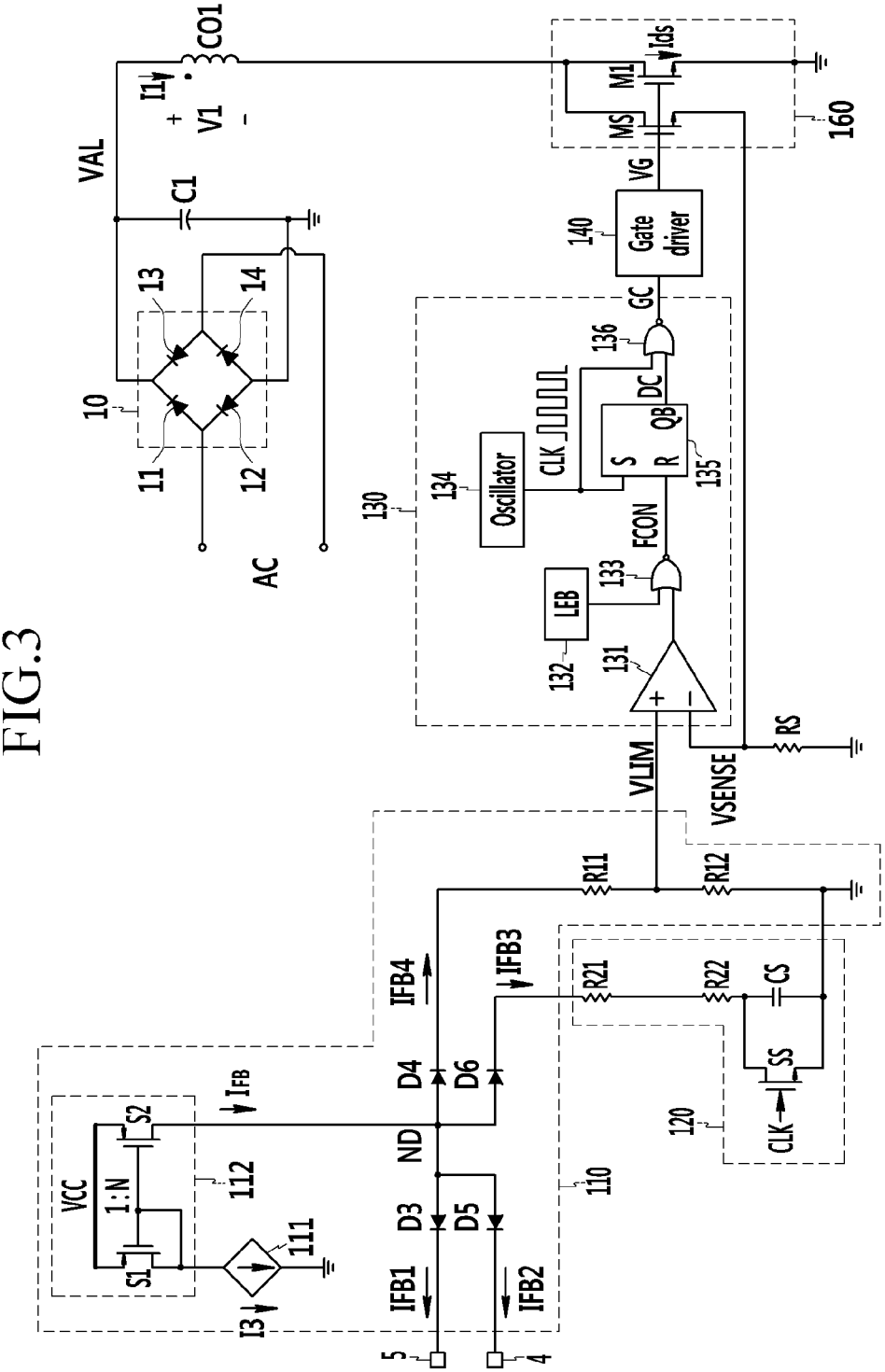
FIG. 3 is a view of a constitution of a feedback controller, a slope compensator, and a PWM controller according to an exemplary embodiment of the present invention.

FIG. 3 is a view of a constitution of the feedback controller 110, the slope compensator 120, and the PWM controller 130 according to an exemplary embodiment of the present invention.

The feedback controller 110 includes a current source 111, a current mirror circuit 112, four diodes D3-D6, and two resistors R11 and R12.

The current source 111 as a dependent current source flowing at an absolute temperature generates the current I3 that is proportional to the absolute temperature.

The current mirror circuit 112 copies the current I3 with a predetermined ratio to generate a feedback current IFB. The current mirror circuit 112 includes a transistor S1 and a transistor S2. A copy ratio is determined according to a ratio between the channel width/length of the transistor S1 and the channel width/length of the transistor S2.

The gate electrode and the drain electrode of the transistor S1 are connected to the current source 111, and the source electrode of the transistor S1 is supplied with the power source voltage VCC. The gate electrode of the transistor S2 is connected to the gate electrode of the transistor S1, and the source electrode of the transistor S2 is supplied with the power source voltage VCC. The drain electrode of the transistor S2 is connected to the node ND.

The power source voltage VCC is connected to the source electrode of the transistor S1 and the transistor S2, however the present invention is not limited thereto, and an inner reference voltage may be used.

The diode D3 is connected between the node ND and the feedback terminal 5. The current IFB1 is supplied to the feedback circuit 200 through the connected diode D3. If the difference between the voltage of the node ND and the feedback voltage VFB is smaller than the threshold voltage of the diode D3, the diode D3 is blocked.

The diode D4 is connected between the node ND and one terminal of the resistor R11. The other terminal of the resistor R11 is connected to one terminal of the resistor R12, and the other terminal of the resistor R12 is grounded. The voltage of the node of the resistor R11 and the resistor R12 is the threshold voltage VLIM. Accordingly, the threshold voltage VLIM is determined by a product of the current IFB4 and the resistor R12. The resistance of the resistor R12 is constant such that the threshold voltage VLIM is determined by the current IFB4. If the difference between the voltage of the node ND and the voltage of one terminal of the resistor R11 is smaller than the threshold voltage of the diode D4, the diode D4 is blocked.

The diode D5 is connected between the node ND and the peak terminal 4. If the difference between the voltage of the node ND and the voltage of the peak terminal 4 is smaller than the threshold voltage of the diode D5, the diode D5 is blocked.

The diode D6 is connected between the node ND and the slope compensator 120.

The slope compensator 120 includes the resistor R21, the resistor R22, the capacitor CS, and the switch SS.

One terminal of the resistor R21 is connected to the cathode of the diode D6, and one terminal of the resistor R22 and the other terminal of the resistor R21 are connected. The other terminal of the resistor R22 is connected to one terminal of the capacitor CS and the drain electrode of the switch SS. The other terminal of the capacitor CS and the source electrode of the switch SS are grounded, and the gate electrode of the switch SS is applied with the clock signal CLK.

The switch SS is a transistor of an N-channel type such that it is turned on by a high level of the clock signal CLK and is turned off by a low level of the clock signal CLK.

The present invention is not limited thereto, and the switch SS may be an analog switch. For example, the switch SS may be a transmission gate.

If the clock signal CLK becomes the high level and the switch SS is in the turn-on state, the impedance of the slope compensator 120 is the sum of the values of the resistor R21 and the resistor R22. After the period in which the clock signal CLK has the high level, if the clock signal CLK is decreased to the low level and the switch SS is turned off, the impedance of the slope compensator 120 is the sum of the values of the resistors R21 and R22 and the capacitor CS.

Hereafter, the period in which the switch SS is turned on by the high level of the clock signal CLK such that the threshold voltage VLIM is constantly maintained is referred to as an initial period.

As the capacitor CS is charged by the current IFB3, the voltage of the capacitor CS is increased such that the current IFB3 is decreased. The current IFB3 is the value of which the difference between the voltage of the node ND and the voltage of the capacitor CS is divided by the sum of the values of the resistor R21 and the resistor R22 such that the current IFB3 is decreased as the voltage of the capacitor CS is increased. Accordingly, it is the same as the impedance of the slope compensator 120 being increased from the time that the initial period is finished.

After the switch SS is turned off, the current IFB3 is the value of which the exponential function is multiplied by the current ifb3 flowing at the turn-off time of the switch SS. Here, the exponential function is decreased according to a time constant. This is represented by Equation 1 as follows.

$$IFB3 = ifb3 * e^{(-t/RC)} \qquad \text{(Equation 1)}$$

The initial value ifb3 of the current IFB3 is determined by the ratio of R21+R22:R11+R12, and the ratio is set up as 1:1 in an exemplary embodiment of the present invention. Here, the R is the sum of the values of the resistor R21 and the resistor R22, and C is the capacitance of the capacitor CS. The current IFB4 is increased by a value that the current IFB is decreased.

The PWM controller 130 includes a comparator 131, an LEB (leading edge blanker) 132, logical calculation units 133 and 136, an oscillator 134, and an SR flip-flop 135.

The comparator 131 outputs the result of comparing the threshold voltage VLIM and the sensing voltage VSENSE. The comparator 131 includes a non-inversion terminal (+) input with the threshold voltage VLIM, and an inversion terminal (−) input with the sensing voltage VSENSE. If the input of the non-inversion terminal (+) is larger than the input of the inversion terminal (−), the comparator 131 outputs a signal of a high level, and if the input of the non-inversion terminal (+) is less than the input if the inversion terminal (−), a signal of a low level is output.

The LEB 132 prevents the power switch 160 from being turned off by the quick increase of the sensing voltage VSENSE generated at the moment that the power switch 160 is increased. The quick increase of the sensing voltage VSENSE is generated by the overcurrent generated at the turn-on time of the power switch 160.

The logical calculation unit 133 generates the off control signal FCON determining the turn-off time of the power switch 160. If the level of the off control signal FCON according to the output of the comparator 131 and the output of the LEB 132 is determined, the logical calculation method of the logical calculation unit 133 is determined. A logical calculation unit 133 according to an exemplary embodiment of the present invention is realized by a NOR gate executing a NOR calculation. According to the NOR calculation, when the input signals are all the low level, the high level is output, and when at least one of the input signals is the high level, the low level is output.

The LEB 132 according to an exemplary embodiment of the present invention outputs the signal of the high level during a predetermined blanking period from the turn-on time of the power switch 160. Thus, regardless of the output of the comparator 131, the logical calculation unit 133 outputs the off control signal FCON of the low level during the blanking period.

The oscillator 134 generates the clock signal CLK having a predetermined frequency.

The SR flip-flop 135 generates the duty control signal DC determining the gate control signal GC according to the clock signal CLK and the off control signal FCON.

The SR flip-flop 135 includes a set terminal S input with the clock signal CLK, a reset terminal R input with the off control signal FCON, and an inversion output terminal QB outputting the duty control signal DC. The SR flip-flop 135 generates the output of the low level in synchronization with the increasing edge of the input of the set terminal S, and generates the output of the high level in synchronization with the increasing edge of the input of the reset terminal R. The output of the SR flip-flop 135 is output through the inversion output terminal QB.

The logical calculation unit 136 receives the clock signal CLK and the duty control signal DC to generate the gate control signal GC. If the level of the gate control signal GC according to the clock signal CLK and the duty control signal DC is determined, the logical calculation method of the logical calculation unit 136 is determined. The logical calculation unit 136 according to an exemplary embodiment of the present invention is realized by a NOR gate executing a NOR calculation.

The gate driver 140 generates the gate signal VG according to the gate control signal GC. The gate driver 140 according to an exemplary embodiment of the present invention generates the gate signal VG of the high level according to the gate control signal GC of the high level, and the gate signal VG of the low level according to the gate control signal GC of the low level.

The SR flip-flop 135 outputs the duty control signal DC of the low level by the increasing edge of the clock signal CLK.

The input signals of the logical calculation unit 136 are the low level at the time that the high level pulse of the clock signal CLK is finished such that the logical calculation unit 136 outputs the gate control signal GC of the high level. Thus, the power switch 160 is turned on by the gate signal VG of the high level.

The blanking period is passed after the turn-on time of the power switch 160, and the output of the LEB 132 becomes the low level. Next, if the sensing voltage VSENSE reaches the threshold voltage VLIM, the output of the comparator 131 becomes the low level. Thus, the input signals of the logical calculation unit 133 are all the low level, and the off control signal FCON becomes the high level.

The SR flip-flop 135 generates the duty control signal DC of the high level according to the off control signal FCON of the high level, and the logical calculation unit 136 generates the gate control signal GC of the low level.

Accordingly, the power switch 160 is turned off at the time that the sensing voltage VSENSE reaches the threshold voltage VLIM.

Figure 4:
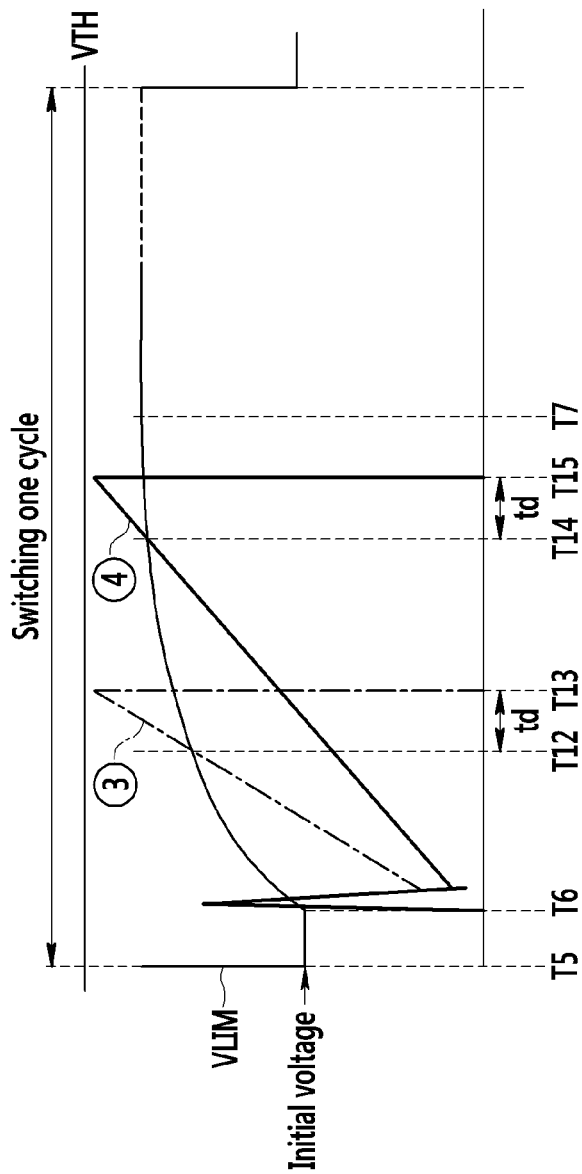
FIG. 4 is a view showing a waveform of a threshold voltage during one cycle of a switching operation according to an exemplary embodiment of the present invention.

FIG. 4 is a view showing a waveform of a threshold voltage during one cycle of switching according to an exemplary embodiment of the present invention. The threshold voltage VLIM is the product of the current IFB4 and the resistor R12 such that the waveform of the current IFB4 and the waveform of the threshold voltage VLIM are the same.

As described above, it is set up that the sum of the values of the resistor R11 and the resistor R12 is the same as the sum of the values of the resistor R21 and the resistor R22. Accordingly, it is set up that the initial voltage of the threshold voltage VLIM is 50% of the maximum voltage.

If the clock signal CLK becomes the high level at the time T5 such that the switch SS is turned on, the initial period T5-T6 is started. The impedance of the slope compensator 120 is the same as in the path in which the current IFB4 flows (R11+R12=R21+R22) such that the current IFB3 and the current IFB4 are equal to each other.

If the switch SS is turned off by the clock signal CLK at the time T6 (after the initial period), the capacitor CS is charged by the current IFB3. The current IFB3 is decreased with the exponential function like Equation 1 during the charging period of the capacitor CS such that the current IFB4 is increased with a curved line shape of which the increasing slope is decreased. Accordingly, the threshold voltage VLIM is increased with the curved line shape in the initial voltage.

By the charging of the capacitor CS, if the voltage difference between both terminals of the diode D6 is less than the threshold voltage, the diode D6 is blocked, and the current IFB3 does not flow to the slope compensator 120 at the time T7. Thus, the current IFB4 that is increased is constantly maintained from the time T7. Here, the current IFB4 is two times the current of the initial period such that the threshold voltage VLIM is constantly maintained at two times compared with the initial period.

As shown in FIG. 4, the drain current Ids according to an exemplary embodiment of the present invention is not over the current threshold value regardless of the AC line voltage.

The AC line voltage VAL when the sensing voltage VSENSE of the third waveform indicated by a one-point chain line is generated is higher than the AC line voltage VAL when the sensing voltage VSENSE of the fourth waveform indicated by the solid line. The sensing voltage VSENSE is the voltage generated according to the drain current Ids such that the drain current Ids of the same size flows if the level of the sensing voltage VSENSE is the same.

The power switch 160 is turned on by the decreasing of the clock signal CLK at the time T6.

The sensing voltage VSENSE reaches the threshold voltage VLIM at the time T12, and the power switch 160 is turned off at the time T13 after the delay period td.

The sensing voltage VSENSE of the fourth waveform of which the AC line voltage VAL is low reaches the threshold voltage VLIM at the time T14, and the power switch 160 is turned off at the time T15 after the delay period td.

As shown in FIG. 4, the level that the sensing voltage VSENSE of the third waveform reaches at the time T13 and the level that the sensing voltage VSENSE of the fourth waveform reaches at the time T15 are not over the voltage threshold value VTH corresponding to the current threshold value. Accordingly, the levels are not over the current threshold value of the drain current Ids of the high AC line voltage corresponding to the third waveform and the drain current Ids of the low AC line voltage corresponding to the fourth waveform.

The switch SS is turned on at the initial period such that the impedance of the slope compensator 120 is the same as the sum of the values of the resistors R11 and R12. Accordingly, the current IFB3 and the current IFB4 of the initial period are the same. If the current IFB3 is not generated by the charging of the capacitor CS, the current IFB4 is two times that of the initial period.

Accordingly, the threshold voltage VLIM at the time that the current IFB3 is not generated is two times the threshold voltage VLIM of the initial period. This is because the sum R11+R12 of the resistors connected to the diode D4 is the same as the sum R21+R22 of the resistors connected to the diode D6.

The initial voltage may be appropriately set by controlling the ratio of the sum R11+R12 of the resistors and the sum R21+R22 of the resistors.

As described above, the power supply device and the driving method according to an exemplary embodiment of the present invention compensates the level of the threshold voltage VLIM such that the drain current Ids may be controlled to not be over the current threshold value regardless of the AC line voltage VAL. This is referred to as AC line voltage compensation.

The power supply device and the driving method according to an exemplary embodiment of the present invention uses the current of the feedback circuit used for the conventional power supply device as it is to execute the AC line voltage compensation, and thereby there is no additional current. Accordingly, the consumption power is not increased.

Also, as shown in the above Equation 1, the threshold voltage VLIM is controlled by using a resistor-capacitor charging method by the current IFB3. If the resistor-capacitor is controlled by reflecting the characteristic of the switch current according to the AC line voltage when there is no AC line voltage compensation, the current threshold value of the switch current may be controlled to not be affected to the AC line voltage.

In general, the current source generating the feedback current IFB is the dependent current source that is proportional to the absolute temperature. The characteristic of the temperature of the dependent current source according to the temperature change and the characteristic of the temperature of the power switch are different such that it is not necessary for the offset to be compensated.

If a circuit for the AC line voltage compensation is added, an additional circuit must also be required to compensate the offset for the temperature change of the elements constituting the added circuit. However, the AC line voltage compensation method according to an exemplary embodiment of the present invention only uses the resistor, the capacitor, and the switch connected in parallel to the capacitor to control the current IFB3 corresponding to the predetermined ratio of the feedback current, and thereby the offset according to the temperature change is very small.

In addition, according to an exemplary embodiment of the present invention, an additional element to directly sense the AC line voltage for the AC line voltage compensation is not necessary, and an additional pin to receive the information for the AC line voltage is not necessary in the switch circuit.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS bridge rectifier diode 10, smoothing capacitor C1, transformer 20
switch circuit 100, feedback circuit 200, power source voltage supply unit 300
rectifier diode D1, output capacitor C2, diode 11-14, D1-D6
first coil CO1, second coil CO2, third coil L3, power switch 160
resistor R1, R2, R11, R12, R21, R22, zener diode 212, photodiode 211
capacitor C3, CS, phototransistor 213, switch control circuit 150,
switch M1, MS, SS, feedback controller 110, slope compensator 120
PWM controller 130, gate driver 140, current source 111, current copy circuit 112
compensation controller 121, comparator 131, LEB 132, logical calculation unit 133, 136
oscillator 134, SR flip-flop 135

What is claimed is:

1. A power supply device generating an output power by using an AC line voltage generated through a rectifying of an AC input, comprising:
    a transformer including a first coil input with the AC line voltage;
    a power switch connected to the first coil;
    a feedback circuit generating a feedback voltage corresponding to an output voltage of the output power; and
    a switch control circuit receiving a sensing voltage corresponding to a drain current flowing to the power switch and the feedback voltage, generating a threshold voltage by controlling a feedback current every switching cycle of the power switch, and comparing the sensing voltage and the threshold voltage to control the switching operation of the power switch,
    wherein the feedback current includes a first current to generate the feedback voltage, and the threshold voltage follows a curved line waveform of which an increasing slope thereof is decreased during the switching cycle.

2. The power supply device of claim 1, wherein
the switch control circuit includes
a slope compensator maintaining constant impedance during a predetermined initial period from the switching cycle time, and having impedance that is increased after the passage of the initial period, and
the feedback current includes a second current supplied to the slope compensator.

3. The power supply device of claim 2, wherein
the slope compensator includes:
a first resistor;
a second resistor connected to the first resistor in series;
a capacitor connected to the second resistor; and
a switch connected in parallel to the capacitor,
wherein the second current flows through the first resistor, the second resistor, and the switch during the initial period, and the second current flows through the first resistor, the second resistor, and the capacitor after the initial period.

4. The power supply device of claim 3, wherein
the switch control circuit further includes
a feedback controller generating the feedback current and connected to the slope compensator and the feedback circuit, and
the feedback controller generates the threshold voltage by using a third current among a remaining current of which the first current and the second current are subtracted from the feedback current.

5. The power supply device of claim 4, wherein
the feedback controller includes
a first diode including an anode connected to the current copy circuit,
a third resistor connected to a cathode of the first diode, and
a fourth resistor connected to the third resistor in series,
wherein the third current flows to the third resistor and the fourth resistor through the first diode, and the threshold voltage is determined by the third current and the fourth resistor.

6. The power supply device of claim 5, wherein
the feedback controller includes
a second diode including an anode connected to the current copy circuit and a cathode connected to the feedback circuit, and
a third diode including an anode connected to the current copy circuit and a cathode connected to the slope compensator.

7. The power supply device of claim 6, wherein
the feedback controller further includes
a fourth diode including an anode connected to the current copy circuit and a cathode connected to the peak resistor, and
the fourth current of the feedback current except for the first to third currents is supplied to the peak resistor.

8. The power supply device of claim 3, wherein
the switch control circuit controls a switching operation of the power switch by using a clock signal having a predetermined frequency,
the switch is switching-operation according to the clock signal, and the initial period is a first level (a high level) directly before the power switch is turned on by the clock signal.

9. The power supply device of claim 8, wherein
the switch control circuit controls a turn-off time of the power switch according to a result of comparing the threshold voltage and the sensing voltage, and includes a PWM controller turning on the power switch when the clock signal is changed from the first level to the second level.

10. The power supply device of claim 9, wherein
the PWM controller includes
a comparator comparing the threshold voltage and the sensing voltage,
an LEB generating the output of the third level during a predetermined blanking period from the turn-on time of the power switch, and a first logical calculation unit logical-calculating the output of the LEB and the comparator to generate an off control signal controlling a turn-off time of the power switch.

11. The power supply device of claim 10, wherein
the first logical calculation unit generates the off control signal of a level that does not turn off the power switch by the third level output of the LEB during the blanking period.

12. The power supply device of claim 11, wherein
the PWM controller includes
an oscillator generating a clock signal,
an SR flip-flop generating a duty control signal according to the clock signal and the off control signal, and
a second logical calculation unit generating a gate control signal according to the clock signal and the output of the SR flip-flop,
wherein the SR flip-flop changes the level of the duty control signal into a fourth level when the level of the clock signal is changed from the second level to the first level after the turn-off time of the power switch,
the first logical calculation unit changes the level of the off control signal into a fifth level in synchronization with a time at which the sensing voltage reaches the threshold voltage, and
the second logical calculation unit generates a gate control signal turning off the power switch according to an off control signal of the fifth level, and generates the gate control signal turning on the power switch when the level of the clock signal is changed from the first level to the second level after the generation of the duty control signal of the fourth level.

13. A driving method of a power supply device including a feedback circuit generating a feedback voltage corresponding to an output voltage and a power switch controlling the output voltage, comprising:

generating a feedback current;
supplying a first current among the feedback current to a feedback circuit to generate a feedback voltage corresponding to the output voltage;
forming a path through which a second current flows among the feedback current and increasing impedance of the path among a switching cycle of the power switch; and
generating a threshold voltage to control a turn-off time of the power switch by using a third current among the feedback current.

14. The driving method of claim 13, further comprising
constantly maintaining the impedance of the path during a predetermined initial period from the switching cycle time of the power switch.

15. The driving method of claim 13, wherein
the path includes a resistor and a capacitor, and
the increasing of the impedance of the path includes
charging the capacitor by the second current and
decreasing the second current by the charging of the capacitor.

16. The driving method of claim 15, wherein
the second current is decreased with an exponential function according to a time constant determined by the resistor and the capacitor.

17. The driving method of claim 13, further comprising
comparing the threshold voltage and a sensing voltage corresponding to a current flowing to the power switch to determine a turn-off time of the power switch.

18. The driving method of claim 17, wherein
the second current is decreased with a shape in which a decreasing slope is decreased, and the third current is decreased with a shape in which an increasing slope is decreased.

* * * * *